Sept. 22, 1953     S. T. CARTER     2,652,941
PNEUMATIC TRANSFER PAD FOR LABELING MACHINES
Filed Sept. 23, 1950     8 Sheets-Sheet 1

Fig. 1

Inventor
Sidney T. Carter
by Roberts Cushman & Grover
Att'ys.

Sept. 22, 1953 S. T. CARTER 2,652,941
PNEUMATIC TRANSFER PAD FOR LABELING MACHINES
Filed Sept. 23, 1950 8 Sheets-Sheet 3

Inventor
Sidney T. Carter
by Roberts Cushman & Grover
Att'ys.

Sept. 22, 1953 S. T. CARTER 2,652,941
PNEUMATIC TRANSFER PAD FOR LABELING MACHINES
Filed Sept. 23, 1950 8 Sheets-Sheet 4

Inventor
Sidney T. Carter
by Roberts Cushman Grover
Att'ys.

Sept. 22, 1953 S. T. CARTER 2,652,941
PNEUMATIC TRANSFER PAD FOR LABELING MACHINES
Filed Sept. 23, 1950 8 Sheets-Sheet 5

Inventor
Sidney T. Carter
by Roberts Cushman & Grover
Att'ys.

Fig. 14    Fig. 15

Inventor
Sidney T. Carter

Sept. 22, 1953     S. T. CARTER     2,652,941
PNEUMATIC TRANSFER PAD FOR LABELING MACHINES
Filed Sept. 23, 1950     8 Sheets-Sheet 8

Inventor
Sidney T. Carter
by Roberts Cushman & Grover
Att'ys.

Patented Sept. 22, 1953

2,652,941

UNITED STATES PATENT OFFICE 2,652,941

PNEUMATIC TRANSFER PAD FOR LABELING MACHINES

Sidney T. Carter, Worcester, Mass., assignor, by mesne assignments, to Geo. J. Meyer Manufacturing Co., Cudahy, Wis., a corporation of Wisconsin Application September 23, 1950, Serial No. 186,449

19 Claims. (Cl. 216—13)

This invention pertains to labeling machines and more especially to label-applying elements, in particular to an improved transfer pad of the pneumatic type.

According to one customary procedure, the label is removed from the magazine by a glue-coated picker and is taken from the picker by a pneumatic transfer pad which carries the label to the applying position and places the adhesively coated face of the label in contact with the surface of the article which is to be labeled. A machine operating upon this principle is disclosed in the patent to Carter 2,414,019 dated January 7, 1947.

Usually the transfer pad is designed to take a single label from the picker and to apply it to the article. While it is possible, by means of a single pad and by the use of a picker such as disclosed in the aforesaid Carter patent, to apply two independent labels simultaneously to a single, flat surface or to a single, cylindrically curved surface, it is not possible, by the use of a single applicator pad of usual prior construction, to apply two labels simultaneously to flat surfaces which are offset or in different planes, nor to curved surfaces of different radii. However, it is frequently required to apply more than one label to the same article, for example to apply a label to the body of a bottle, to the shoulder of the bottle, and/or to the neck of the bottle. Heretofore, the application of several labels to offset surfaces or surfaces of different diameters has required the use of a corresponding number of pickers and transfer pads and complex mechanism for actuating the several pads in properly timed relation.

One object of the present invention is to provide simple and effective means whereby a plurality of labels may be applied simultaneously to surfaces which are offset (as for instance, the body and shoulder portions of a bottle) or in different planes, or of different radii of curvature (as, for instance, the body and neck portions of a bottle). A further object is to provide label-applying means comprising a single, movable support, actuated in properly timed relation to the pickers and other parts of the labeling machine, and which carries a plurality of transfer pads designed simultaneously to apply labels to surfaces which are relatively offset or of different diameters. A further object is to provide label-applying means wherein a single picker device simultaneously receives a plurality of different labels from a magazine or magazines and delivers them to a compound transfer pad which is operative simultaneously to apply the several labels to the article designed to receive them. A further object is to provide a transfer device wherein independent transfer pads are mounted upon a movable support in such a way that the label-contacting surfaces of the several pads may, at times, lie in the same plane and at other times in different planes. A further object is to provide a compound transfer pad comprising relatively movable parts each operative to receive a label from a picker and to apply its respective label to the article to be labeled. Other and further objects and advantages of the invention will be pointed out in the following more detailed description and by reference to the accompanying drawings wherein.

Referring to the drawings, the present invention is herein illustrated as incorporated in a straightaway machine of the kind disclosed in the patent to Ekvall 1,630,235, dated May 24, 1927, but modified as to the pickers and related parts, as shown in Patent No. 2,414,019 to Carter above referred to.

The Ekvall machine is of the type commonly known as the "straightaway" machine, the articles to be labeled being progressed along a substantially rectilinear path—stopping at the label-receiving position to receive a label and then continuing on in the same direction. The machine shown in the Ekvall patent employs a swinging picker which receives a coating of gum from a gum-applying roll, then advances to a magazine where a label adheres to the gummed surface of the picker and then moves back to the label-applying position, adjacent to an article to be labeled, where the label is pressed against the article by a grip finger which strips the label from the picker as the latter moves away. In the patent to Carter, the picker is shown as comprising laterally separable blades and the transfer pad is of pneumatic type and is arranged to pass between the blades of the picker, after the blades have been laterally separated (while the picker dwells at a transfer station spaced from the article), the pad receiving the label from the picker blades and carrying it over to and applying it to the article designed to receive it.

Figure 1:
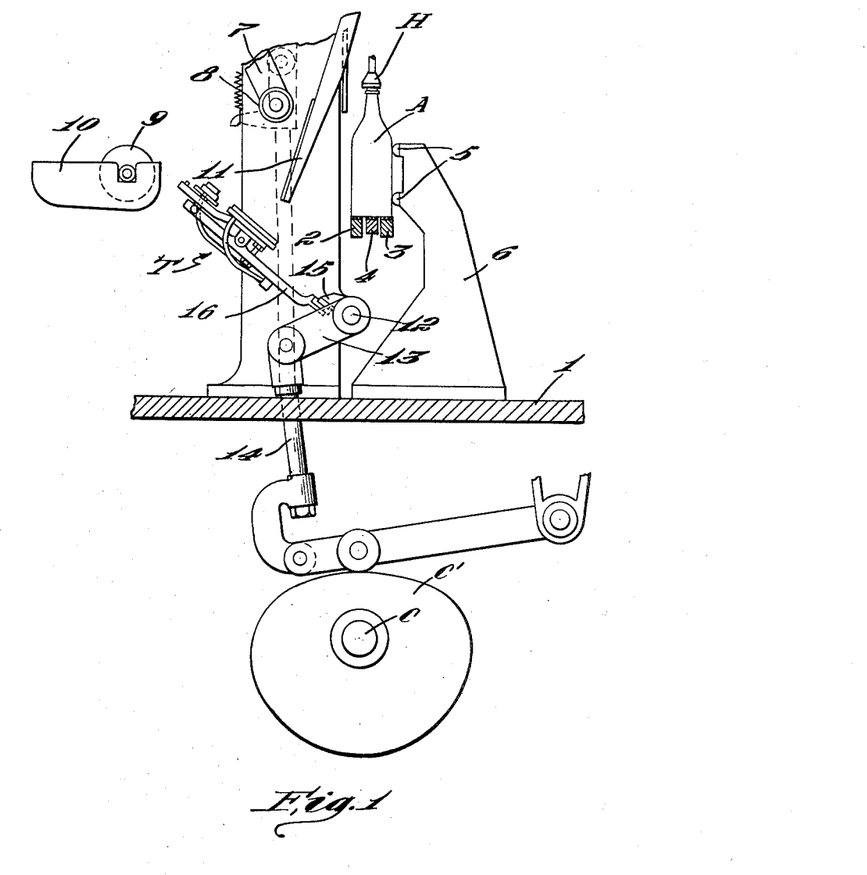
Fig. 1 is a fragmentary, vertical section, perpendicular to the guide rails of a labeling machine of the straightaway type, showing relative positions of the picker and transfer device of the present invention.

In Fig. 1, the labeling machine is shown as comprising a bed or table 1 which may be supported in any suitable way, for example by legs (not shown) at a desirable elevation above the floor. Below this bed is the power driven cam shaft C, by means of which the various operative instrumentalities of the machine are actuated. The machine comprises the horizontally spaced parallel supporting rails 2 and 3 along which the articles A, here shown as bottles, are moved intermittently by a bar 4 which rises to lift an article slightly from the rails 2 and 3, then moves forward to advance the articles along the rails and then drops and in its lowered position moves horizontally back to the starting point to begin a new cycle of operations. As illustrated, fixed guide rails 5, carried by brackets 6 mounted on the table 1, are designed to engage the articles A and to steady them as they are moved along the conveyor path and to constitute abutments for the article at the label-receiving point so as to support the article against the pressure to which it is subjected during the application of the label.

A lever 7, the lower part only of which is shown, is mounted to swing in a vertical plane and carries a gum transfer roll 8 which, at times, is moved into contact with a rotating gum-applying roll 9 mounted on the gum reservoir 10. The picker, which comprises transversely separable blades 11 (only one of which is here shown) is of the type disclosed in the Carter patent above referred to and is designed to swing back and forth about a horizontal axis. The picker is arranged so that at the proper time it receives gum from the roll 8, then moves to the magazine (not shown) where the gum coated surfaces of the picker blades contact a label and remove the label from the magazine. The picker blades 11 then move to the substantially vertical position indicated at Fig. 2, where they dwell while the transfer pad is brought into contact with the exposed, ungummed surface of the label, the picker blades then separating and the transfer pad passing between them and advancing toward the article so as to carry the label from the transfer point and place it in contact with the article. In this type of machine it is customary to provide a hold-down device H which engages the top of the bottle in order to steady the bottle as it is subjected to various operations involved in the application of the label.

Figures 4, 20, 21, 22, 23:
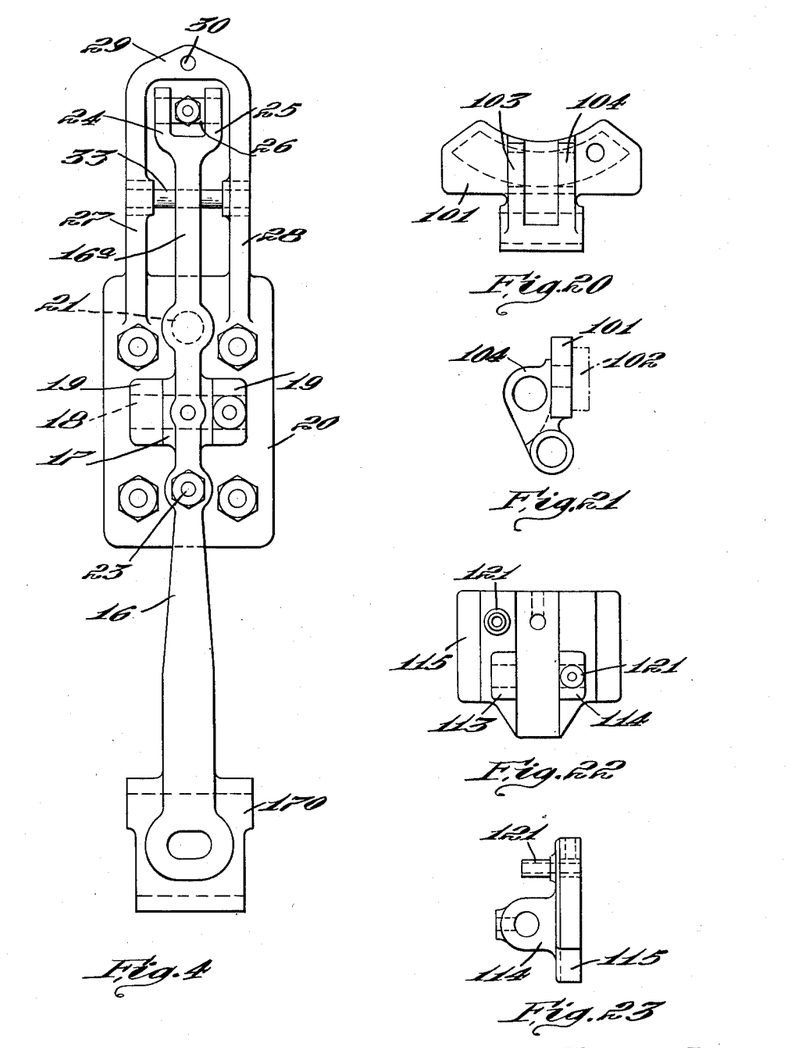
Fig. 4 is an elevation, viewed from the left-hand side of Fig. 2, showing transfer pad supporting means in accordance with one embodiment of the invention.
Fig. 20 is a plan view of the support for applying the shoulder label.
Fig. 21 is a side elevation of the support shown in Fig. 20.
Fig. 22 is a plan view of the support for the pad which applies the neck label.
Fig. 23 is a side elevation of the support shown in Fig. 22.

The improved transfer means of the present invention (indicated at T, Fig. 1) is mounted upon the horizontal shaft 12, having a crank arm 13 which is actuated by a rod 14, receiving its motion from a cam C' on the cam shaft C of the machine. A second arm 15 (Figs. 1 and 2) is fixed to the shaft 12 and to this arm 15 is secured the upright, supporting arm 16 upon which are mounted the transfer pads hereafter described. This arm 16, as shown in Fig. 4, has a transversely widened foot portion 170 having a horizontal slot which receives a bolt 180 (Fig. 2) by means of which the arm 16 is adjustably secured to the arm 15 so that the arm 16 partakes of the swinging movement of the arm 15.

Figure 5:
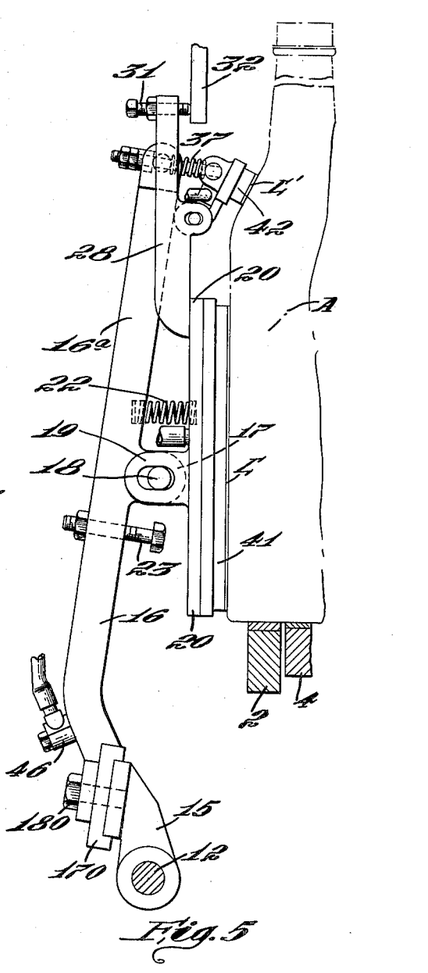
Fig. 5 is a view similar to Fig. 2, but showing the transfer device in the label-applying position.

The arm 16 is provided with a boss 17 (Figs. 4 and 5) in which is fixed a horizontal stud shaft 18 whose opposite ends are received in bearing openings in ears 19 projecting rearwardly from the carrier plate 20 for the carrier pad 41 which is designed to apply a label to the body portion of the article A. Above the boss 17 the arm 16 is provided with a socket 21 (Fig. 4) (in its right-hand face as viewed in Fig. 2) for the reception of one end of a compression spring 22, the opposite end of which seats in a socket in the left-hand face of the transfer pad carrier 20. The spring as thus arranged tends to swing the pad carrier 20 in clockwise direction about the axis of the shaft 18. An adjustable stop member 23 has screw threaded engagement with an opening in the arm 16, and bears against the left-hand face of the pad carrier 20 at a point below the axis of the shaft 18 and thus limits the turning of the pad carrier by the spring 22. Preferably, as illustrated, the bearing openings which receive the ends of shaft 18 are horizontally elongate. When the parts are in the position of Fig. 2, the shaft 18 is disposed near the left-hand end of the bearing openings, due to the action of spring 22, the part 20 fulcruming about the stop screw 23. In the position of Fig. 5, the shaft 18 is near the right hand end of the bearing opening, the fulcrum point thus being the end of screw 31. By this means, the pad carrier is permitted to position itself so as to conform to the surface of each individual bottle.

The arm 16 is continued upwardly above the socket 21 to provide the extension 16a whose upper end is forked to provide the horizontally spaced tines 24 and 25 having aligned openings for the reception of the opposite ends of a pin 26.

The pad carrier 20 is provided with an upward extension of inverted U-shape (Fig. 4) comprising the horizontally spaced, parallel legs 27 and 28 united at their upper ends by the bend or yoke 29. The legs 27 and 28 are spaced apart so as to provide for free passage of the forked upper end of the member 16a between them. The yoke 29 is provided with a screw threaded opening 30 for the reception of an adjustable stop screw 31 (Figs. 2 and 3) which, at times, engages a fixed abutment member 32 carried by the machine frame.

The legs 27 and 28 are provided with aligned preferably horizontally elongate bearing openings for the reception of the ends of a horizontal stud shaft 33 which forms a pivotal support for the carrier 34 for an auxiliary transfer pad 42. This carrier 34 (Fig. 3) has parallel bosses 35 projecting from its left-hand face having aligned openings for the reception of the opposite ends of a pin 36 (Fig. 3) having a central, diametrical opening through which passes a pin 37 which also passes through a diametrical opening in the pin 26. A coiled compression spring 38 encircles the pin 37 and bears at its opposite ends against the pins 26 and 36 respectively. The rod 37 has a head at its right-hand end and is provided at its left-hand end (Fig. 3) with a spacer sleeve 39 which bears at one end against the pin 26 and at its opposite end against an adjustable nut 40 having threaded engagement with the left-hand end of the rod 37.

The pad carrier 20 is provided with the transfer pad 41 (Figs. 2 and 5) which may be of conventional pneumatic type, having a multitude of suction openings which communicate with a chamber within the pad carrier. Likewise the auxiliary carrier 34 (Fig. 3) is provided with the pneumatic type pad 42 having suction openings which communicate with a chamber 44 within the auxiliary pad carrier 34. The chamber in the carrier 20 communicates with a flexible tube 43, and the chamber 44 likewise communicates with a flexible tube 45, the tubes 43 and 45 leading to a manifold 46 (Figs. 2 and 5) mounted on the arm 16. From this manifold a flexible tube (not shown) extends to the air pump or other device whereby suction is created at the proper times at the transfer pads.

The arrangement illustrated in Figs. 1 to 5 inclusive is designed to apply a main label L to the cylindrical body portion of the article A and an auxiliary label L' to the shoulder portion of the article A. In the operation of the device (it being assumed that the picker blades 11 have received a main label L and an auxiliary label L' from appropriate magazines and have been moved to the upright transfer position indicated in broken lines in Fig. 2), (where they dwell while the blades are laterally separated), the arm 16 being in the position shown in Fig. 2. At this position the stop member 23 engages the left-hand face of the pad carrier 20 and thus holds the latter in position so that its label-receiving face is accurately parallel to the face of the picker which carries the label. In this position the legs 27 and 28 are parallel to the upper portion 16a of the arm 16, and in this position the rod 37 holds the auxiliary pad carrier 34 so that the label-carrying face of the pad 42 is accurately parallel with the label carrying face of the picker and in the same plane with the label-contacting face of the pad 41. While the picker dwells in this position, suction is created at the pads 41 and 42 so that the labels preferentially adhere to the pads 41 and 42 and while they so adhere, the blades 11 of the picker are laterally separated, moving away from each other in a plane parallel to the label-engaging faces of the transfer pads. When the picker blades have thus been separated, the arm 16 is swung to the right to the position shown in Fig. 5. The pads pass between the picker blades and carry the labels over toward the article A. When the resiliently yieldable pad 41 brings the label into contact with the body of the bottle, the pad assumes a configuration such that the label is pressed against the surface of the bottle with substantially uniform pressure from top to bottom, the spring 22 yielding in response to the pressure, but maintaining a substantial pressure such as to assure adhesion of the label. In this position the legs 27 and 28 are substantially vertical (assuming that the face of the bottle is vertical) the legs being fixed relatively to the pad carrier 20, but at this time the arm 16a is inclined, its forked upper end having entered between the legs 27 and 28 and the pad carrier 34 has swung to a position such that the label L', carried by the pad 42, is applied to the shoulder portion of the bottle. The spring 37 provides for yielding pressure so that the label is pressed against the bottle with force sufficient to insure adhesion. It may be noted that when the arm 16a swings to the right, the stop screw 31 engages the fixed abutment 32 and thus determines the position of the transfer pad 20, the stop screw 31 being adjusted in accordance with the slope of the side wall of the body of the bottle so that the transfer pad 20 will be properly positioned with respect to the article to be labeled.

With this arrangement it is possible to apply two labels simultaneously to the article by the use of a single transfer device which is actuated by a single cam on the main cam shaft. Since it is readily possible to remove two labels from appropriate magazines by the same picker blades, it is thus practical to apply two labels simultaneously, one to the body and one to the shoulder portion of the bottle, without adding substantially to the complexity of the machine and so that successive label-applying operations become unnecessary.

Figures 2, 3:
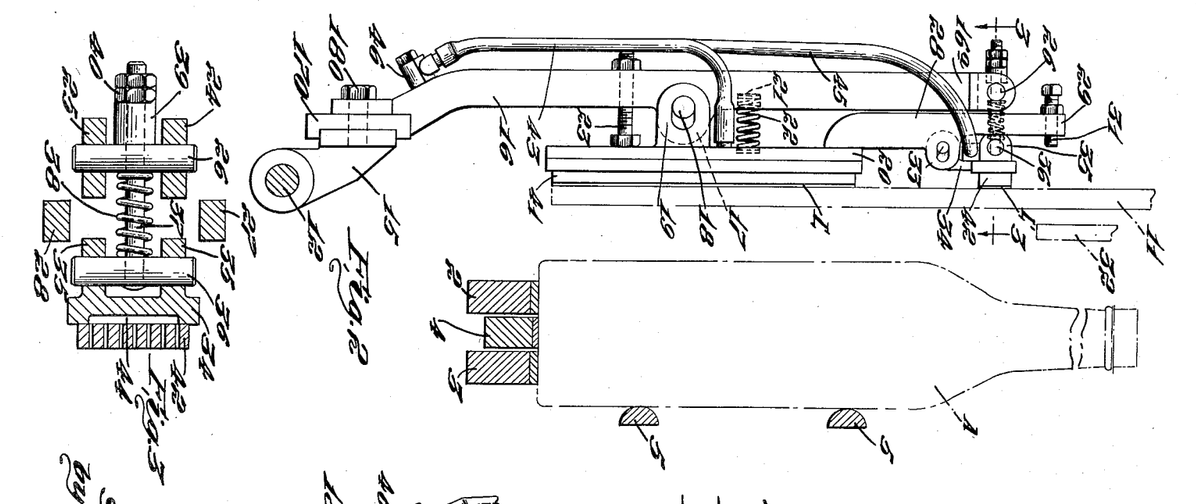
Fig. 2 is a fragmentary, vertical section, to larger scale than Fig. 1, showing the transfer device in the transfer position which it occupies when receiving labels from the picker, the latter being shown in broken lines.
Fig. 3 is a horizontal section, to larger scale than Fig. 2, substantially on the line 3—3 of Fig. 2.

The modified construction illustrated in Figs. 6 to 13 inclusive is designed to apply two labels simultaneously to the body portion of the bottle and a third label to the neck portion of the bottle. The bottle A is supported in the label-receiving position by means such as shown in Figs. 2 and 5 previously described and the transfer device is actuated by the shaft 12, having the arm 15 to which the lower portion 170 of the transfer arm 160 is connected by the bolt 180.

The arm 160 is provided with a boss 47 (Fig. 6) at its right-hand side, which has a threaded bore for the reception of the adjustable stop screw 48 whose head is designed at times to contact the left-hand face of the pad carrier 56 to limit rocking movement of the latter in a clockwise direction.

Above the boss 47 the arm 160 is forked to provide the horizontally spaced, parallel tines 49 and 50 (Fig. 12) and these tines 49 and 50 are provided with aligned openings for the reception of the opposite ends of a shaft 52 which forms a pivotal support for a lever 53 (Figs. 6 and 7) which extends upwardly beyond the upper end of the arm 160 and which supports the carrier 66 for the shoulder-label transfer pad, as hereafter described. The lever 53 is provided with an arm 53ª which extends down below the axis of the shaft 52 and this arm 53ª is provided with a transverse bore for the reception of a shaft 54 whose opposite ends are received in aligned openings in ears 55 projecting from the rear side of the carrier 56 which supports the transfer pads 57 and 58 for the body labels L² and L³.

Above the shaft 52 the tines 49 and 50 are provided with sockets 59 (Fig. 12) which receive the rear or left-hand ends of compression springs 60 (Figs. 6 and 7) whose forward or right-hand ends are received in sockets provided at the rear of the transfer pad carrier 56. These springs tend to turn the carrier 56 about the axis of the shaft 54 in a clockwise direction, such movement being limited by the stop screw 48. The tines 49 and 50 are extended upwardly beyond the sockets 59 to form an inverted U-shaped frame, the upper ends of the legs 49ª and 50ª being integrally united by the yoke 61, the latter having a central screw threaded opening 62 which receives an adjustable stop screw 63 (Figs. 6 and 7) which at times engages a fixed abutment 64 carried by the machine frame.

Figure 6:
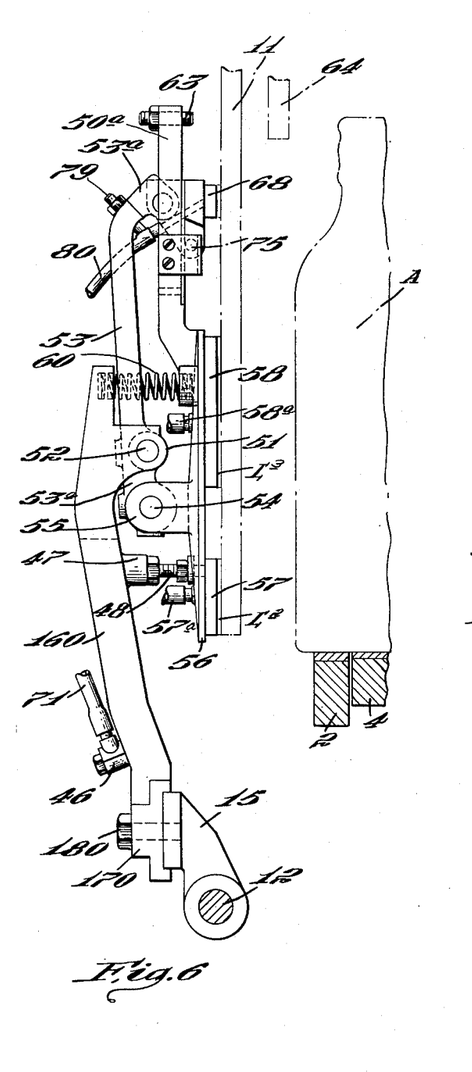
Fig. 6 is a view generally similar to Fig. 2, but illustrating a modified construction wherein provision is made for the simultaneous application of two labels to the body portion of a bottle and the application of another label to the shoulder portion of the bottle, the parts being shown in the position which they occupy when receiving labels from the picker, the latter being indicated in broken lines.
Figure 7:
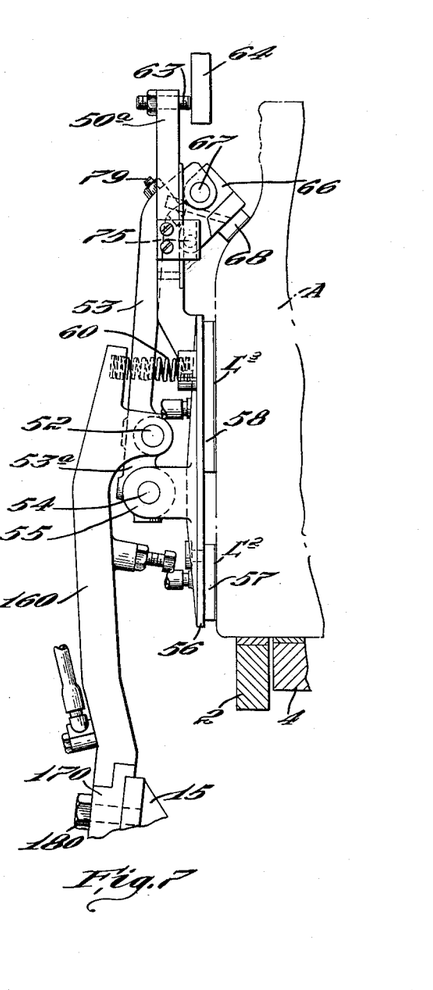
Fig. 7 is a view similar to Fig. 6, but showing the parts positioned to apply the labels to the bottle.
Figures 8, 9, 10, 11:
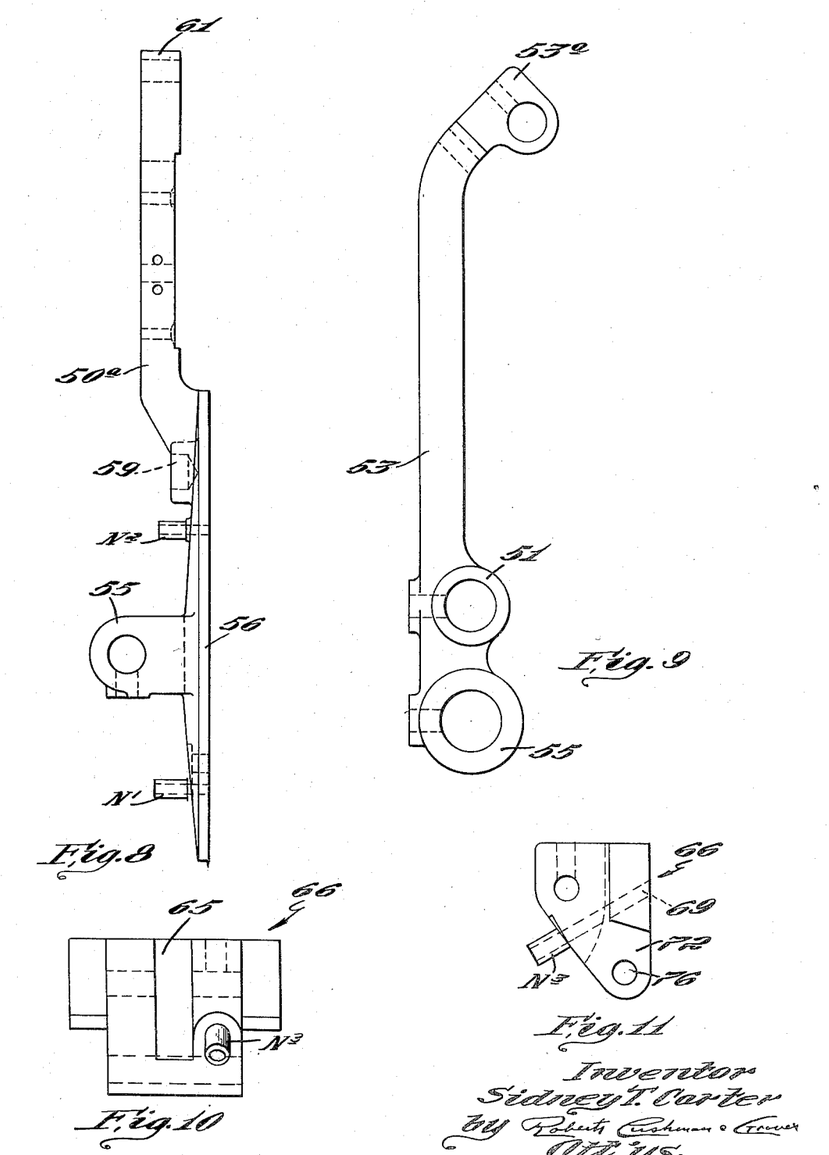
Fig. 8 is an edge elevation, to larger scale than Fig. 6, showing the support for the transfer pads which apply the labels to the body portion of the bottle.
Fig. 9 is a side elevation, to larger scale than Fig. 6, showing the carrier for the pad which applies the label to the shoulder of the bottle.
Fig. 10 is a rear elevation of the carrier for the pad which applies the shoulder label.
Fig. 11 is a side elevation of the carrier shown in Fig. 10.

The upper end portion 53ª (Figs. 6 and 9) of the lever 53 (Fig. 9) is bent toward the right, this upper end portion being designed to fit within a slot 65 (Figs. 10 and 11) in the carrier 66 for the shoulder label transfer pad 68 (Fig. 7). A pivot pin 67 (Fig. 7) unites the carrier 66 to the upper end portion 53ª of the support 53. The carrier 66 is of more or less triangular shape (Fig. 11) in side elevation, its lower portion 72 being provided with an opening 76 which receives a pin 75 (Figs. 6, 7 and 13) whose opposite ends project from the part 72. The upwardly extending legs 49ª and 50ª of part 160 are provided with angle plates 73 and 74 (Fig. 13) secured to their outer faces, the angle plates having flanges 77 and 78 which are directed toward each other and which form guides for the projecting ends of the pin 75. The upper end 53ª of the support is provided with a screw threaded bore which receives an adjustable stop pin 79 which, at times, engages the rear surface of the pad carrier 66.

The pad carrier 66 is provided with a passage 69 (Fig. 11) which communicates with the interior chamber of the suction pad 68 (Figs. 6 and 7) the passage 69 terminating in a nipple N³ (Fig. 11) projecting rearwardly from the carrier 66. From this nipple a flexible tube 80 (Fig. 6) extends down to a manifold 46 which is connected by suitable means to the air pump or other suction device. The carrier 56 is likewise provided with nipples N¹ and N² (Fig. 8) which receive the ends of flexible tubes 57ª and 58ª (Fig. 6) which likewise extend down to the manifold 46.

In the operation of this device, and assuming that the parts are as shown in Fig. 6 and that a picker 11 of the type above described has received three labels from a suitable supply, suction will be created at the several pads 57, 67 and 68, thus preferentially adhering the labels to the suction pads 57, 67 and 68, the picker plates then separating and the support 160 swinging to the right to the position shown in Fig. 7. In so swinging, the stop 63 is eventually brought into contact with the abutment 64, the stop 63 having been adjusted so that when the parts are thus positioned the pad support 56 is arranged (either vertically or inclined) so that the labels, carried by the pads 57 and 58 contact the body of the article A, the springs 60 permitting the necessary yield to compensate for slight irregularities in the surface of the article being labeled. As the pads 57 and 58 come into contact with the surface of the article and the movement of the upper ends of the legs 49ª and 50ª is stopped by the abutment 64, the upper end 53ª of the support 53 passes between the legs 49ª and 50ª and in so doing, the ends of the pin 75, by engagement with the guides 77 and 78, cause the carrier 66 to swing about the pivot pin 67, thus bringing the pad 68 into proper position to contact the label carried thereby with the shoulder of the bottle.

Thus with this arrangement three labels may simultaneously be applied to the bottle, two to the body and one to the shoulder of the bottle, all of these labels being received from the same picker and all of the transfer pads being actuated by the same cam on the cam shaft of the machine. Obviously, the pads which carry the body labels may be of different size and contour, or differently oriented. Thus as indicated in Fig. 12, the pad P (shown in dotted lines) is inclined relatively to the pad P'.

Figures 12, 13, 16:
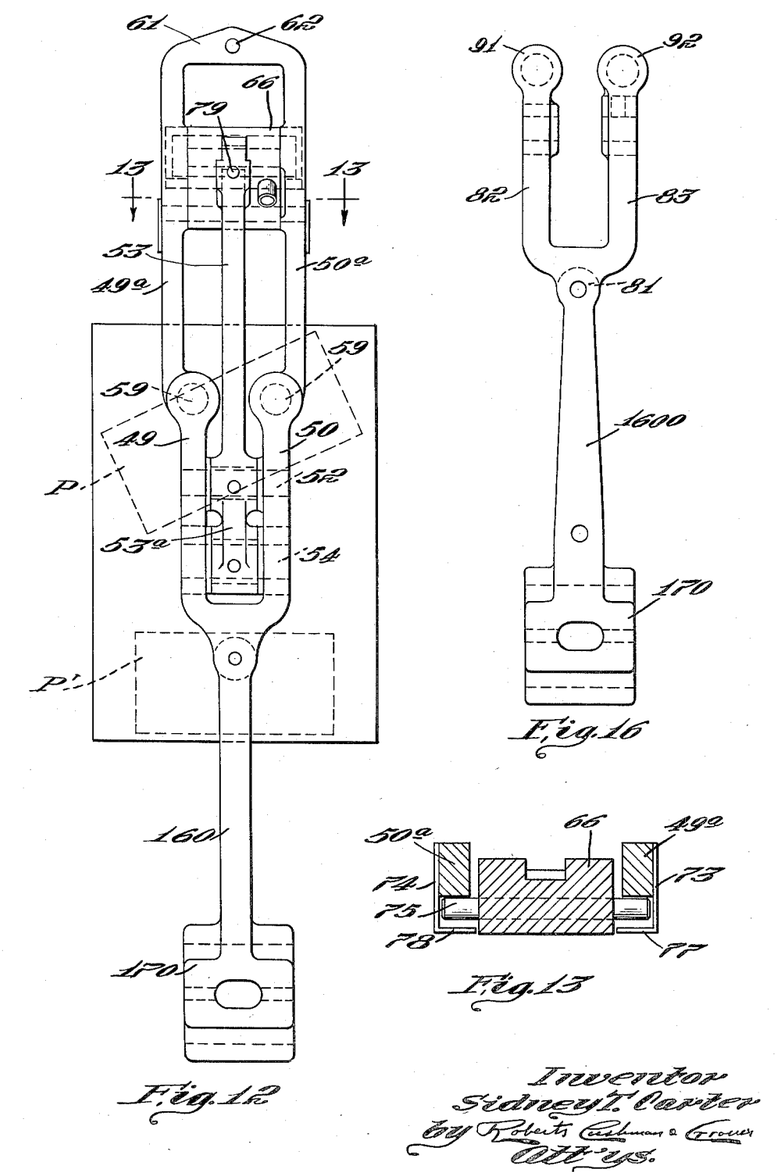
Fig. 12 is a rear elevation of the support for the body label pads assembled with the carrier for the shoulder-applying pad.
Fig. 13 is a fragmentary, horizontal section substantially on the line 13—13 of Fig. 12.
Fig. 16 is a rear elevation, to larger scale, of the supporting and actuating arm of the transfer device of Figs. 14 and 15.

Referring to Figs. 14 to 23 inclusive, which illustrate transfer means operative to apply labels simultaneously to the neck, shoulder and body of the bottle, the transfer device comprises the supporting and actuating arm 1600 which is connected at its lower end 170 by a bolt 180 to the arm 15 carried by the shaft 12, as above referred to. The arm 1600 is provided with a boss 81 (Fig. 14) having a screw threaded opening for the reception of a stop screw 82 designed to limit rocking movement of the carrier 90 for the pad P³ which applies the body label. Above the boss 81 the arm 1600 is forked, as shown in Fig. 16, to provide horizontally spaced, parallel tines 82 and 83. These tines are provided with forwardly directed bosses 84 (Fig. 14) which have aligned openings receiving the opposite ends of a pivot pin 85 on which is pivoted the lever 86 (Figs. 14, 15, 18 and 19) having an arm 87 which projects below the pivot pin 85. The lower end of this arm is received between spaced lugs 89 (Fig. 17) projecting from the rear side of the rigid pad carrier 90 which carries the pad P³. A pin 88 pivotally connects the carrier 90 to the lower end of the lever 87.

The upper end (Fig. 16) of the arm 1600 is provided with sockets 91 and 92 for the reception of the rear ends of compression springs 93 (Figs. 14 and 15) whose forward ends are received in sockets S² (Fig. 17) in the rear side of the support 90, the springs tending to rock the carrier 90 in a clockwise direction about the pivot pin 88.

Spaced, parallel legs 94 and 95 (Fig. 17) project upwardly from the carrier 90 and, together with an integral yoke member 96, form an inverted, substantially U-shaped rigid frame. The part 96 is provided with a central screw threaded opening for the reception of an adjustable stop member 98 (Figs. 14 and 15) which is engageable at times with a fixed abutment 99 (Fig. 15) carried by the machine frame thereby to determine the plane of the label-contacting face of pad P³ when the latter is in label-applying position.

Figure 14:
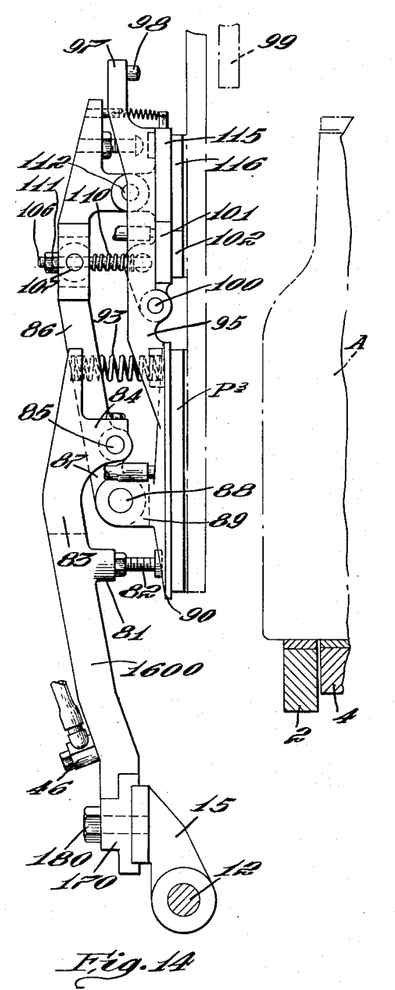
Fig. 14 is a view similar to Fig. 2, but illustrating a modification wherein provision is made for simultaneously applying a label to the body of the bottle, a label to the shoulder portion of the bottle and a label to the neck portion of the bottle, the parts being shown as positioned to receive labels from the picker, the latter being indicated in broken lines.
Figure 15:
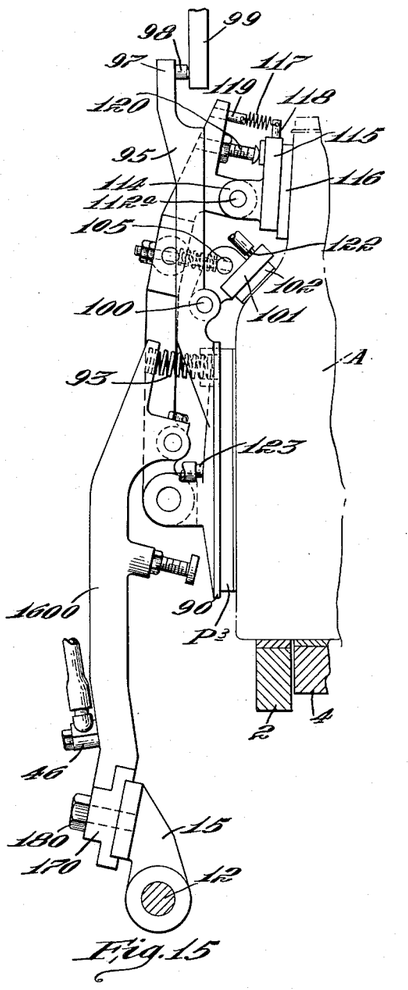
Fig. 15 is a view similar to Fig. 14, but showing the parts positioned to apply the labels to the bottle.
Figure 17:
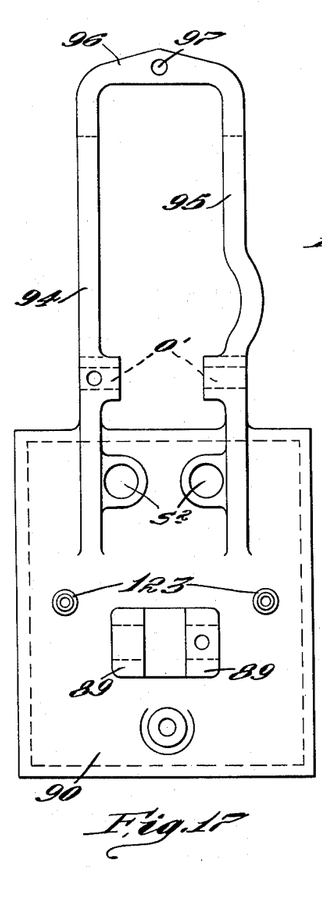
Fig. 17 is a rear elevation of the support for the body label pad of the device of Fig. 14.
Figure 18:
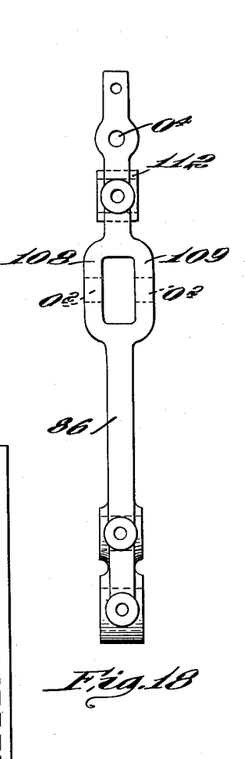
Fig. 18 is a rear elevation of the lever which carries the support for the neck label pad of the device of Fig. 14.
Figure 19:
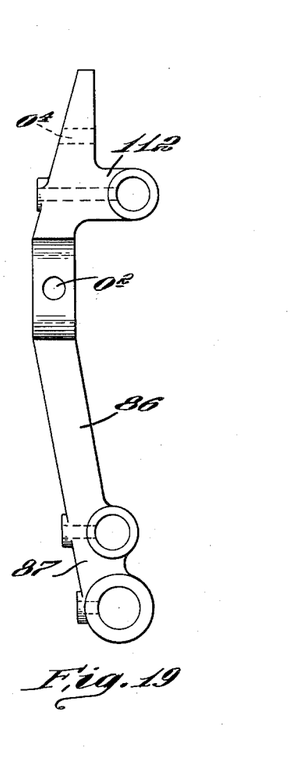
Fig. 19 is a side elevation of the lever shown in Fig. 18.

The legs 94 and 95 are provided with aligned openings O¹ (Fig. 17) just above the upper edges of the support 90 which receive the opposite ends of a pivot pin 100 (Figs. 14 and 15) by means of which a rigid carrier 101 for the shoulder label pad 102 is pivotally united to the parts 94 and 95. The carrier 101 (Figs. 14, 20 and 21) is provided with spaced, parallel, rearwardly directed ribs 103 and 104 (Fig. 20) having aligned openings which receive the opposite ends of a pivot pin 105 (Fig. 15) having a diametrical, central opening which receives the forward end of a rod 106 (Fig. 14). The rear portion of this rod 106 passes through a diametrical opening at the center of a pivot pin 107 whose opposite ends are received in aligned openings O² (Figs. 18 and 19) in a bifurcated portion of the lever 86, comprising the spaced, parallel parts 108 and 109. A coiled compression spring 110 (Fig. 14) encircles the rod 106 and urges the carrier 101 for the pad 102 in a clockwise direction about the pivot pin 100. Adjustable nuts 111 on the rear end of the rod 106 permit the spring 110 to be adjusted.

Near its upper end the lever 86 (Figs. 18 and 19) is provided with a forwardly directed boss 112 which is received between parallel ears 113 and 114 (Fig. 22) projecting rearwardly from a carrier 115 for the pad 116 which applies the neck label to the bottle. A pin 112ᵃ (Figs. 14 and 15) pivotally unites the carrier 115 to the lever 86. A tension spring 117 (Fig. 15) is secured at its forward end to a pin 118 projecting from the upper edge of the pad carrier 115 and is connected at its rear end to a pin 119 fixed in the upper end of the lever 86. An adjustable stop screw 120, secured in a threaded opening O⁴ in the upper part of the lever 86 has a head which engages the rear surface of the support 115 and thus limits the clockwise rocking of the support 115 by the action of the spring 117.

A nipple 121 (Fig. 23) projecting from the carrier 115 is designed to receive a flexible tube which extends down to the manifold 46; likewise a nipple 122 (Fig. 15) projecting from the carrier 101 receives a second flexible tube extending to the manifold 46. The carrier 90 for the body label is provided with two projecting nipples 123 (Fig. 17) which receive flexible tubes extending to the manifold, the manifold being connected by suitable means to the air pump or other source of low pressure.

In the operation of this mechanism, and assuming that the parts occupy the position shown in Fig. 14 and that the pickers have received labels from appropriate supplies and are holding them in transfer relation to the several pads P³, 102 and 116, suction is created to cause the labels to adhere preferentially to the pads. The picker blades are now separated and the shaft 12 is turned to carry the transfer pads over to the positions shown in Fig. 15. As the pad P³ comes into contact with the body portion of the bottle, the upper end of the lever 86 is caused to swing relatively to the legs 94 and 95 so as to move the pad carriers 101 and 115 to apply the labels carried by the pads 102 and 116 to the shoulder and neck portions, respectively, of the bottle. Thus, with this arrangement three labels are simultaneously applied to surfaces which are offset (or out of the same plane) and of different radii of curvature, although the entire operation is brought about by a single cam on the cam shaft of the machine, and through the operation of the single actuating and supporting arm 1600.

While certain desirable embodiments of the invention have been illustrated and described, it is to be understood that the invention is broadly inclusive of any and all modifications falling within the scope of the appended claims.

I claim:

1. In combination in a labeling machine wherein a gum-coated picker removes a plurality of labels simultaneously from a supply and carries them to a transfer station where the several labels are disposed in the same plane, means for supporting an article to be labeled, transfer means comprising a rock arm, a transfer pad carrier pivotally connected to the rock arm, an auxiliary transfer pad carrier pivotally connected to the first-named pad carrier, spring means urging each pad carrier to rock about its pivotal axis, means operative temporarily to hold both pad carriers so that the label-contacting faces of their respective pads are in alignment and in transfer position, and means for moving the rock arm to move the pads toward the article to be labeled.

2. In combination in a labeling machine wherein a gum-coated picker removes a plurality of labels simultaneously from a supply and carries them to a transfer station where the several labels are disposed in the same plane, article-supporting means spaced from the transfer station, a plurality of pneumatic transfer pads corresponding to the number of labels so carried by the picker, a rockable supporting arm which carries the several transfer pads, the several pads being pivoted to rock about parallel axes, cam means operative to advance the supporting arm from a transfer position where it dwells to a label-applying position, spring means yieldably urging each transfer pad to turn about its pivotal axis, and adjustable stop means operative to hold the several pads with their label-contacting surfaces in a plane parallel to that of the label-carrying face of the picker when the supporting arm is dwelling in the transfer position, said spring and stop means being so constructed and arranged that when the supporting arm is at the labeling position each pad is free to rock into intimate contact with that surface of the article to which the individual pad is opposed.

3. In combination in a label-applying machine wherein a label is applied to the article to be labeled by a label-holding pad, a rock arm for moving such a pad toward and from the label-applying position, a pad carrier pivotally connected at a point intermediate its upper and lower edges to said rock arm, the pivotal axes of the rock arm and pad carrier being parallel, a pad secured to the carrier, a spring tending to turn the pad carrier about its pivotal axis, and an adjustable stop operative to limit such movement, the pad carrier having a rigid upward extension, and an auxiliary pad carrier pivotally mounted on said extension, the pivotal axes of the pad carriers being parallel.

4. In combination in a label-applying machine wherein a label is applied to the article to be labeled by a label-holding pad, a rock arm for moving such a pad toward and from the label-applying position, a pad carrier pivotally connected at a point intermediate its upper and lower edges to said rock arm, the pivotal axes of the rock arm and pad carrier being parallel, a pad secured to the carrier, an adjustable stop operative to limit such movement, abutment means operative to rock the pad carrier about its pivotal axis in opposition to the spring as the pad approaches the label-applying position, the pad carrier having an inverted U-shaped, upward extension comprising spaced parallel legs, an auxiliary pad carrier pivotally mounted on a pivot pin having its ends fixed in the parallel legs of said extension, and spring means tending to rock said auxiliary pad carrier about the axis of said pivot pin.

5. In combination, in a label-applying machine wherein a label is applied to the article to be labeled by a label-holding pad, a rock arm for moving the pad toward and from the label-applying position, a pad carrier pivotally connected at a point intermediate its upper and lower edges to said rock arm, the pivotal axes of the rock arm and pad carrier being parallel, a pad secured to the carrier, means operative to position the pad carrier so that the label contacting face of its pad is parallel to a label-receiving face of the article to be labeled as the label is contacted with the article by the pad, an auxiliary pad carrier pivotally mounted upon an upward extension of the aforesaid pad carrier, the label-contacting face of the auxiliary pad being disposed parallel to a second receiving face of the article to be labeled when the label carried by the auxiliary pad is contacted with said second surface.

6. In combination in a labeling machine wherein a gum-coated picker removes a plurality of labels simultaneously from a supply and carries them to a transfer station where the several labels are disposed in the same plane, means for supporting an article to be labeled, transfer means comprising a rock arm, a plurality of independently movable, resiliently yieldable pneumatic transfer pads supported by the rock arm, means for moving the rock arm to carry the transfer pads from the transfer station to a label-applying station spaced from the transfer station, each pad being pivoted to rock about a horizontal axis, adjustable stop means operative to position the several pads when they are at the transfer station with their label-contacting faces in a plane close to and parallel with the label-holding face of the picker, said stop means being effective only when the pads are dwelling at the transfer station, and spring means operative to rock the several pads about their individual axes as they approach the label-applying station thereby to position the several labels carried by the pads for adhesive contact with differently contoured surfaces of the article.

7. In combination in a labeling machine wherein a gum-coated picker removes a plurality of labels simultaneously from a supply and carries them to a transfer station where the several labels are disposed in the same plane, means for supporting an article to be labeled, the article to be labeled being a bottle having a body portion, a neck portion and a shoulder portion, and transfer means comprising a rock arm, a carrier for a body-label transfer pad pivotally mounted on the rock arm, a spring urging the pad carrier to turn about its pivotal axis, said pad carrier having a rigid upward extension, an auxiliary pad carrier pivotally mounted on said extension, means operative temporarily to hold the pad carriers with the label contacting surfaces of their respective pads in alignment while in the transfer position, adjustable stop means to determine the inclination of the carrier for the body-label transfer pad while the latter is in the label-applying position, means for moving the rock shaft to carry both pads from transfer to label-applying position, and spring means operative to move the pad carriers relatively about their respective pivotal axes during such motion of the rock shaft, thereby to position the respective pads to apply their labels to corresponding surfaces of the bottle.

8. In combination in a label-applying machine wherein an article to be labeled, having an upright face to receive the label, is supported upon a suitable support at the label-applying position, a pad for applying a label to said upright face of the article, a rock arm mounted to turn about a horizontal axis, a carrier for said pad pivotally connected intermediate its upper and lower edges to the upper part of the rock arm so as to rock about a horizontal axis, a spring intermediate said arm and the carrier so arranged as to tend to rock the upper part of the carrier away from the arm, an adjustable stop for limiting such movement, the pad carrier having a rigid upward extension, adjustable abutment means, including a part carried by said extension, for positioning the pad carrier so that the label-contacting face of its pad is parallel to a label-receiving face of the article as the label is contacted with said face by the pad, an auxiliary pad carrier pivotally supported by said rigid upward extension, a spring tending to rock the auxiliary carrier relatively to the first pad carrier, and adjustable stop means to limit such rocking of the auxiliary pad carrier.

9. In combination in a labeling machine wherein a gum-coated picker removes a plurality of labels simultaneously from a supply and carries them to a transfer station, means for supporting an article to be labeled, and transfer means comprising a rock arm, a lever pivotally mounted on the rock arm, the lever having upper and lower arms, a main transfer pad carrier pivotally mounted on the lower end of the lever, an auxiliary pad carrier pivotally mounted on the upper arm of the lever, the main transfer pad carrier having a rigid, upward extension, a second auxiliary pad carrier pivotally mounted on the upward extension of the main pad carrier, an adjustable stop operative to hold the main pad carrier, when in transfer position, with the label-contacting surface of its pad parallel to the label-carrying surface of the picker, means operative temporarily to hold both auxiliary pad carriers, when in transfer position, with the label-contacting faces of their respective pads parallel to the label-carrying surface of the picker, adjustable stop means operative, as the transfer means approaches the label-applying station, to position the main pad carrier so that the label-contacting surface of its pad is parallel with that surface of the article which is to receive the main label, and means whereby, when the transfer means is in the label-applying position, the auxiliary pad carriers are inclined relatively to the main label-applying pad carrier so that the label-contacting surfaces of the auxiliary pads are disposed in planes different from each other and from that of the main applying pad, and means for moving the rock shaft to carry the transfer means from transfer to label-applying position.

10. In combination in a labeling machine wherein a gum-coated picker removes a plurality of labels simultaneously from a supply and carries them to a transfer station where the several labels are disposed in the same plane, means for supporting an article to be labeled, transfer means comprising a rock arm, a transfer pad carrier pivotally connected to the rock arm, an auxiliary transfer pad carrier pivotally connected to the first-named pad carrier, spring means urging each pad carrier to rock about its pivotal axis, means operative temporarily to hold both pad carriers so that the label-contacting faces of their respective pads are in alignment and in transfer position, and means for moving the rock arm to move the pads toward the article to be labeled, the pivotal connection between the rock arm and the transfer pad carrier being so designed and arranged as to permit bodily horizontal movement of the pad carrier relatively to the rock arm.

11. In combination in a labeling machine wherein a gum-coated picker removes a plurality of labels simultaneously from a supply and carries them to a transfer station where the several labels are disposed in the same plane, means for supporting an article to be labeled, transfer means comprising a rock arm, a transfer pad carrier pivotally connected to the rock arm, an auxiliary transfer pad carrier pivotally connected to the first-named pad carrier, spring means urging each pad carrier to rock about its pivotal axis, means operative temporarily to hold both pad carriers so that the label-contacting faces of their respective pads are in alignment and in transfer position, and means for moving the rock arm to move the pads toward the article to be labeled, the pivotal connection between the pad carrier and the auxiliary pad carrier being so designed and arranged as to permit relative horizontal bodily movement of the two pad carriers.

12. In combination in a labeling machine wherein a gum-coated picker removes a plurality of labels simultaneously from a supply and carries them to a transfer station where the several labels are disposed in the same plane, means for supporting an article to be labeled, the article to be labeled being a bottle having a body portion, a neck portion and a shoulder portion, and transfer means comprising a rock arm, a lever pivotally mounted on the rock arm, the lever having upper and lower arms, a body-label transfer pad carrier pivotally mounted on the lower end of the lever, a shoulder-label pad carrier pivotally mounted on the upper arm of the lever, the body-label transfer pad carrier having a rigid, upward extension, guide means fixed to said upward extension, the shoulder-label pad carrier having a guide follower arranged for sliding engagement with said guide means, stop means operative to position the body-label pad carrier so that the label-receiving surface of its pad is parallel to that of the label-carrying surface of the picker when in the transfer position, the guide follower and guiding means temporarily holding the shoulder-label pad carrier so that the label-contacting surface of its pad is parallel to the label-carrying surface of the picker when in the transfer position, means for moving the rock shaft to carry the transfer means from transfer position to label-affixing position, spring means tending to turn the body-label transfer pad carrier about its pivotal axis, and stop means to determine the position of the latter carrier when the rock arm has been moved to the label-affixing position, the guide follower and the guide means being operative to swing the shoulder-label pad carrier relatively to the body-label pad carrier as the parts approach the label-affixing position.

13. In a labeling machine of the kind wherein bottles to be labeled are moved in succession along a predetermined path with their axes all in the same plane and wherein magazines hold labels designed to be applied to different portions respectively of a bottle, and picker means operative to remove a label from each of the several magazines simultaneously and means for moving the picker means to a dwell position at which all of the several labels, carried by the picker means, lie in a plane parallel to the axis of the bottle to be labeled, in combination, a plurality of relatively movable pneumatic transfer devices, each corresponding to one of the labels to be applied, which are positioned to contact and to grip the labels carried by the picker means while the latter is in said dwell position, and means operative to move the several transfer devices through paths of different extents thereby to apply the labels which they grip to portions of the bottle which are of different radii respectively.

14. In a bottle labeling machine of the kind which has means for supporting a bottle with its axis substantially vertical, the bottle having label-receiving surfaces of different radii, a gum coated picker comprising laterally separable blades and which is operative to remove a plurality of labels simultaneously from a supply and to apply adhesive to the entire surface of each label and means operative to move the picker, with the labels adherent thereto, to a transfer station where the picker dwells with the labels all in the same plane parallel to the axis of the bottle and while the blades are being separated laterally, in combination, a plurality of independent, relatively movable pneumatic transfer pads operative to grip the several labels while the picker dwells at the transfer station and to hold the labels substantially flat while the picker is withdrawn from the transfer station, and means to move the several pads simultaneously through curved paths of different radii of curvature respectively thereby to carry the labels bodily from the transfer station and to apply them simultaneously to corresponding surfaces of the bottle.

15. In apparatus for applying labels to a bottle and wherein an adhesive type picker simultaneously removes neck and body labels from a supply and carries them to a transfer station where they are disposed in a plane parallel to the axis of the bottle but spaced from the bottle, in combination, pneumatic transfer means comprising relatively movable pneumatic pads movable in arcuate paths of different extents about parallel axes respectively, the pads being resiliently yieldable but having normally flat surfaces which contact the neck and body labels on the picker while the latter dwells at the transfer station, the pads gripping and holding the label while the picker is withdrawn from the transfer station, and means operative to move the pads simultaneously to transfer the labels to and apply them to the neck and body respectively of the bottle.

16. In apparatus for applying labels to a bottle having a support for the bottle to be labeled and wherein an adhesive type picker of the separable-blade type receives neck and body labels from a supply, applies adhesive to the entire area of each label and then carries the labels to a transfer station where the picker dwells with the several labels disposed in a plane spaced from the bottle but parallel to the axis of the bottle and where its blades separate while the label is being removed from the picker, in combination, transfer means including independently movable suction pads rockable about different axes respectively and which are temporarily positioned so as to contact and grip the shoulder and body labels on the picker while the latter is dwelling at the transfer station and to hold said labels substantially flat while the picker is being withdrawn from the transfer station, and means operative to move the respective pads along paths of different contour, respectively, thereby to apply the labels which they carry to the neck and body respectively of the bottle.

17. In a labeling machine of the kind which includes means for supporting a bottle to be labeled, the bottle having body and shoulder portions which are of different curvatures and wherein a gum-coated picker, comprising separable blades, removes shoulder and body labels simultaneously from corresponding magazines, applies adhesive to the entire area of each label and then carries the labels to a transfer station where it holds all of the labels in a plane spaced from but parallel to the axis of the bottle and wherein the picker dwells while its blades are separated, in combination, transfer means including a plurality of independently movable suction pads, rockable about different axes respectively, and which are temporarily positioned to grip the shoulder and body labels on the picker while the latter dwells at the transfer station and to hold said labels in said plane while the picker is withdrawn from the transfer station, and means for moving the several pads simultaneously to transfer the labels bodily from the transfer station and apply them simultaneously to the shoulder and body of the bottle, respectively.

18. In a bottle labeling machine of the kind wherein a gum-coated picker removes neck, body and shoulder labels simultaneously from corresponding label magazines and carries them to a transfer station where the picker dwells and holds all of the labels in a plane parallel to the axis of the bottle but spaced from the latter and means for supporting the bottle while it is receiving the labels, in combination, transfer means comprising independent, relatively movable transfer pads for applying labels to the body, neck and shoulder respectively of the bottle, the several pads being positioned, while the picker dwells at the transfer station so that they simultaneously contact and grip the corresponding labels on the picker, independent rock members supporting said pads, and means for actuating the rock members so that, after the picker is withdrawn from the transfer station, the pads bring the several labels simultaneously into contact with the body, neck and shoulder respectively of the bottle.

19. In a labeling machine of the kind in which articles to be labeled are moved in succession along a predetermined path to and from a labeling station, means for supporting an article at the labeling station and picking means operative to remove a plurality of labels simultaneously from a supply and to deliver the several labels to a transfer station at which the picking means dwells and where the labels all lie in the same plane and spaced from the article to be labeled, in combination, a plurality of relatively movable pneumatic transfer pads corresponding in number to the number of labels taken at one time by the picking means, said pads being operative to grip the several labels while the picking means dwells at the transfer station and to hold the several labels while the picking means is withdrawn from the transfer station, and means operative simultaneously to move the several transfer pads, with the labels adherent thereto, through paths of different extents thereby to remove the labels bodily from the transfer station and to apply them respectively to areas of the article which are at different distances from said plane.

SIDNEY T. CARTER.

References Cited in the file of this patent

UNITED STATES PATENTS

| Number | Name | Date |
|---|---|---|
| 900,816 | Woodland | Oct. 13, 1908 |
| 1,029,900 | Weiss | June 18, 1912 |
| 1,521,662 | Williams | Jan. 6, 1925 |
| 2,414,019 | Carter | Jan. 7, 1947 |
| 2,460,214 | Carter | Jan. 25, 1949 |
| 2,497,344 | Chelle | Feb. 14, 1950 |

FOREIGN PATENTS

| Number | Country | Date |
|---|---|---|
| 255,894 | Germany | Jan. 24, 1913 |
| 624,262 | Germany | Jan. 16, 1936 |